(12) United States Patent
Wang et al.

(10) Patent No.: US 9,473,958 B2
(45) Date of Patent: Oct. 18, 2016

(54) METHOD, APPARATUS, AND SYSTEM FOR ADJUSTING CQI FEEDBACK CYCLE

(71) Applicant: Huawei Technologies Co., Ltd., Shenzhen, Guangdong (CN)

(72) Inventors: Chengyi Wang, Shanghai (CN); Xin Huang, Shanghai (CN); Dingzhang Dai, Shanghai (CN); Jinze Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 187 days.

(21) Appl. No.: 14/316,496

(22) Filed: Jun. 26, 2014

(65) Prior Publication Data

US 2014/0334327 A1 Nov. 13, 2014

Related U.S. Application Data

(63) Continuation of application No. PCT/CN2012/087991, filed on Dec. 31, 2012.

(30) Foreign Application Priority Data

Dec. 30, 2011 (CN) .......................... 2011 1 0456025

(51) Int. Cl.
*H04L 12/28* (2006.01)
*H04W 24/02* (2009.01)
*H04L 1/00* (2006.01)

(52) U.S. Cl.
CPC ............ *H04W 24/02* (2013.01); *H04L 1/0026* (2013.01); *H04L 1/0027* (2013.01)

(58) Field of Classification Search
USPC .......................... 370/252, 328, 335; 455/501
See application file for complete search history.

(56) References Cited

U.S. PATENT DOCUMENTS

| | | | |
|---|---|---|---|
| 7,822,044 B2 | 10/2010 | Lee et al. | |
| 2004/0022213 A1* | 2/2004 | Choi | H04W 24/10 370/332 |
| 2005/0277422 A1 | 12/2005 | Baker et al. | |
| 2007/0047502 A1* | 3/2007 | Marinier | H04L 1/0026 370/335 |
| 2009/0163199 A1 | 6/2009 | Kazmi et al. | |
| 2009/0316585 A1* | 12/2009 | Srinivasan | H04W 24/02 370/241 |
| 2011/0228756 A1 | 9/2011 | Kim et al. | |

(Continued)

FOREIGN PATENT DOCUMENTS

| | | |
|---|---|---|
| CN | 1666448 A | 9/2005 |
| CN | 101213769 A | 7/2008 |

(Continued)

OTHER PUBLICATIONS

"Downlink Power Control for E-UTRA", Motorola, 3GPP TSG RAN1#47, Nov. 6-10, 2006, 5 pages.

*Primary Examiner* — Phuongchau Ba Nguyen (57) ABSTRACT

Embodiments of the present invention disclose a method, an apparatus, and a system for adjusting a channel quality indicator CQI feedback cycle. A CQI adjustment parameter fed back by a base station is received, and it is determined according to the CQI adjustment parameter whether a CQI feedback cycle of a user equipment needs to be adjusted; and when it is determined that the CQI feedback cycle needs to be adjusted, the CQI feedback cycle of the user equipment is adjusted, and an adjusted CQI feedback cycle is sent to the user equipment. Therefore, the CQI feedback cycle of the user equipment is dynamically adjusted, and an uplink throughput rate and cell uplink coverage are increased.

11 Claims, 5 Drawing Sheets

(56) References Cited

U.S. PATENT DOCUMENTS

| | | |
|---|---|---|
| 2012/0040622 A1 | 2/2012 | Ren et al. |
| 2012/0099471 A1* | 4/2012 | Brannstrom .......... H04L 1/0026 370/252 |
| 2012/0122503 A1* | 5/2012 | Ma ........................ H04W 16/10 455/501 |

FOREIGN PATENT DOCUMENTS

| | | |
|---|---|---|
| CN | 102438318 A | 5/2012 |
| EP | 2 096 877 A1 | 9/2009 |
| KR | 20080085984 A | 9/2008 |
| KR | 20110079005 A | 7/2011 |

* cited by examiner

METHOD, APPARATUS, AND SYSTEM FOR ADJUSTING CQI FEEDBACK CYCLE

CROSS-REFERENCE TO RELATED APPLICATIONS

This application is a continuation of International Application No. PCT/CN2012/087991, filed on Dec. 31, 2012, which claims priority to Chinese Patent Application No. 201110456025.9, filed on Dec. 30, 2011, both of which are hereby incorporated by reference in their entireties.

TECHNICAL FIELD

The present invention relates to field of communications technologies, and in particular, to a method and an apparatus for adjusting a CQI feedback cycle.

BACKGROUND

High speed downlink packet access (High Speed Downlink Packet Access, HSDPA) is an important feature of the 3rd Generation Partnership Project (The 3rd Generation Partnership Project, 3GPP) R5 version, and downlink high-speed data transmission is implemented by using a series of key technologies. In an HSDPA algorithm, a user equipment feeds back a channel quality indicator (Channel Quality Indicator, CQI) of a high speed downlink shared channel on an uplink high speed dedicated physical control channel, to represent an upper limit of data transmission under a current channel condition. After receiving the CQI fed back by the user equipment, a base station may compare currently available power resource with an assumptive power value, and then adjust a final CQI, to ensure that the power resource is made full use of. Usually, for a certain type of service, a CQI feedback cycle is configured with a fixed value.

SUMMARY

Embodiments of the present invention provide a method, an apparatus, and a system for adjusting a CQI feedback cycle, so as to dynamically adjust a CQI feedback cycle of a user equipment, and increase an uplink throughput rate and cell uplink coverage.

In one aspect, a method for adjusting a CQI feedback cycle is provided and includes:

receiving a CQI adjustment parameter fed back by a base station, and determining, according to the CQI adjustment parameter, whether a CQI feedback cycle of a user equipment needs to be adjusted; and when it is determined that the CQI feedback cycle needs to be adjusted, adjusting the CQI feedback cycle of the user equipment, and sending an adjusted CQI feedback cycle to the user equipment.

In another aspect, an apparatus for adjusting a CQI feedback cycle is provided and includes:

a receiving module, configured to receive a CQI adjustment parameter fed back by a base station;

a judging module, configured to determine, according to the CQI adjustment parameter received by the receiving module, whether a CQI feedback cycle of a user equipment needs to be adjusted; and a processing module, configured to, when the judging module determines that the CQI feedback cycle needs to be adjusted, adjust the CQI feedback cycle of the user equipment, and send an adjusted CQI feedback cycle to the user equipment.

In still another aspect, a system for adjusting a CQI feedback cycle is provided and includes:

a base station controlling apparatus and a base station, where the base station is configured to feed back a CQI adjustment parameter to a base station controlling apparatus, and when the base station controlling apparatus determines that a CQI feedback cycle needs to be adjusted, forward a CQI feedback cycle adjusted by the base station controlling apparatus to a user equipment.

In the method, apparatus, and system provided by the embodiments of the present invention, the CQI adjustment parameter fed back by the base station is received, and it is determined, according to the CQI adjustment parameter, whether the CQI feedback cycle of the user equipment needs to be adjusted; and when it is determined that the CQI feedback cycle needs to be adjusted, the CQI feedback cycle of the user equipment is adjusted, and an adjusted CQI feedback cycle is sent to the user equipment. Therefore, the CQI feedback cycle of the user equipment is dynamically adjusted, and the uplink throughput rate and the cell uplink coverage are increased.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

In the embodiments of the present invention, a CQI feedback cycle of a user equipment can be dynamically adjusted according to a real-time network state, for example, a cell load situation, a user number, and a user equipment transmit power value, to increase an uplink throughput rate and cell uplink coverage. The user equipment may be a terminal apparatus such as a cell phone.

When the network is busy, for example, a cell uplink load is limited or the cell user number is relatively large, at this time, a control channel occupies relatively high power, and an uplink capacity may encounter a bottleneck. The CQI feedback cycle may be increased, to reduce the uplink load occupied by the control channel, and increase the cell uplink capacity. When the network is not busy, for example, the network load is relatively small and the cell user number is relatively small, the uplink capacity encounters no bottleneck. At this time, the CQI feedback cycle may be decreased, to increase a downlink throughput rate of an HSDPA cell.

When the user equipment transmit power is limited, and cell uplink coverage performance is relatively poor, the cell coverage performance may be improved by adjusting the CQI feedback cycle. Whether the user equipment transmit power is limited may be determined in the following manners. The first manner is based on a 6A event and a 6B event fed back by the user equipment. When the transmit power measured by the user equipment is higher than a certain threshold for some time, the user equipment may feed back the 6A event, and when the transmit power is lower than another threshold for some time, the user equipment may feed back the 6B event. The second manner is based on a user equipment transmit power headroom (UE transmission Power Headroom, UPH) measurement value fed back by the user equipment. The UPH fed back by the user equipment indicates a value of a currently remaining transmit power of the user equipment. The transmit power currently used by the user equipment can be obtained through calculation with a maximum transmit power, and whether the user equipment transmit power is limited can be determined through comparison with a preset power threshold. If the user equipment transmit power is limited, the user equipment needs to increase the CQI feedback cycle; and if the user equipment transmit power is changed from limited to unlimited, the user equipment needs to decrease the CQI feedback cycle.

Further, the CQI feedback cycle may be adjusted only when the user equipment makes access, the CQI feedback cycle may also be adjusted after the user equipment makes access, or the CQI feedback cycle is adjusted before or after the user equipment makes access.

Figure 1:
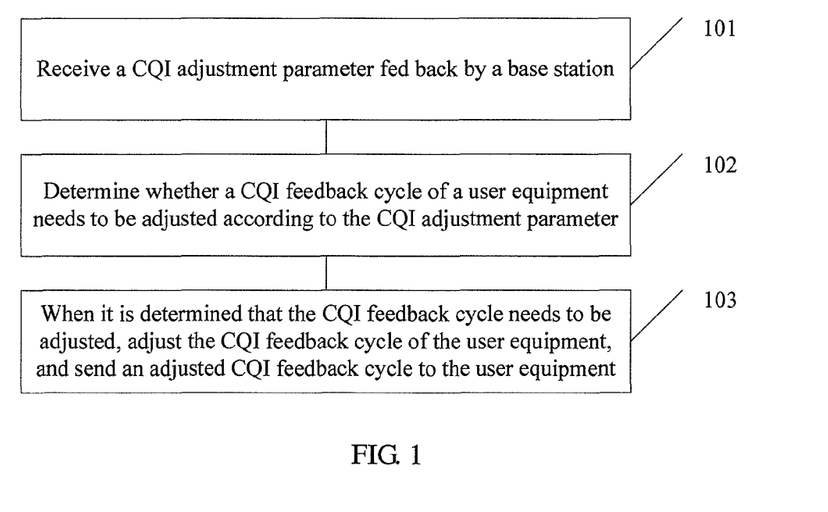
FIG. 1 is a schematic flowchart of a method for adjusting a CQI feedback cycle according to an embodiment of the present invention.

FIG. 1 is a schematic flowchart of a method for adjusting a CQI feedback cycle according to an embodiment of the present invention, including:

Step 101: Receive a CQI adjustment parameter fed back by a base station.

The adjustment parameter may be a cell load value measured by the base station, or a cell user number measured by the base station, or a user equipment transmit power value reported by the base station, or an event type reported by the base station.

Step 102: Determine, according to the CQI adjustment parameter, whether a CQI feedback cycle of a user equipment needs to be adjusted.

An initial CQI feedback cycle of the user equipment is configured by a base station controlling apparatus. Usually, the feedback cycle includes a long cycle and a short cycle. The base station controlling apparatus sends a radio bearer (Radio Bearer, RB) reconfiguration instruction to configure a fixed feedback cycle for a certain type of service.

Further, in response to real-time variations of the cell load situation, the user number, and the user equipment transmit power, the base station controlling apparatus needs to determine in real time whether the CQI feedback cycle of the user equipment needs to be adjusted.

Step 103: When it is determined that the CQI feedback cycle needs to be adjusted, adjust the CQI feedback cycle of the user equipment, and send an adjusted CQI feedback cycle to the user equipment.

The adjusting the CQI feedback cycle of the user equipment includes changing the CQI feedback cycle of the user equipment from the long cycle to the short cycle, or changing the CQI feedback cycle of the user equipment from the short cycle to the long cycle, where a modified CQI feedback cycle is set by the base station controlling apparatus.

Further, the base station controlling apparatus sends the RB reconfiguration instruction to the user equipment, where the reconfiguration instruction carries the adjusted CQI feedback cycle, and the user equipment performs CQI feedback according to the new feedback cycle.

In the embodiment of the present invention, the CQI feedback cycle of the user equipment is dynamically adjusted according to the real-time network state, for example, the cell load situation, the user number, and the user equipment transmit power, so as to increase an uplink throughput rate and cell uplink coverage.

Figure 2:
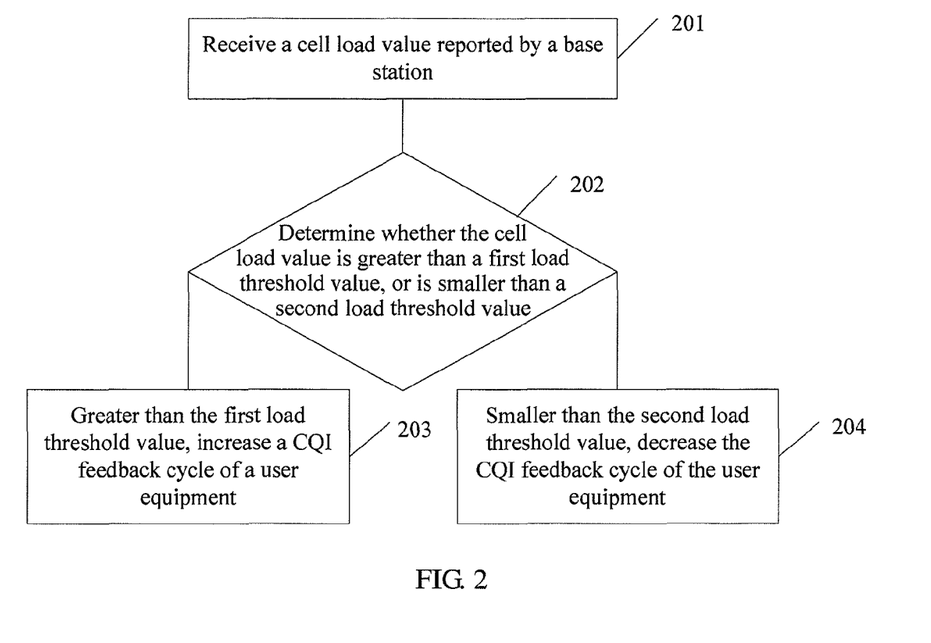
FIG. 2 is a schematic flowchart of a method for adjusting a CQI feedback cycle according to another embodiment of the present invention.

FIG. 2 is a schematic flowchart of a method for adjusting a CQI feedback cycle according to another embodiment of the present invention, including:

Step 201: Receive a cell load value reported by a base station.

The cell load value is monitored by the base station and reported by the base station to a base station controlling apparatus.

Step 202: Determine whether the cell load value is greater than a first load threshold value, or is smaller than a second load threshold value.

If the base station controlling apparatus determines that the fed back cell load value is greater than the set first load threshold value, it indicates that a control channel consumes too much power, and an uplink capacity may encounter a bottleneck, and execute step 203: increase a CQI feedback cycle of a user equipment. That is, the base station controlling apparatus adjusts a short cycle to a long cycle.

Further, if the base station controlling apparatus determines that the fed back cell load value is smaller than the second load threshold value, it indicates that a network is in a non-busy state, a network load is relatively small, and the uplink capacity encounters no bottleneck, and execute step 204: decrease the CQI feedback cycle of the user equipment. That is, the base station controlling apparatus adjusts the long cycle to the short cycle.

Further, the foregoing first load threshold value and second load threshold value are set by the base station controlling apparatus, and the first load threshold value is greater than the second load threshold value. The foregoing threshold values can be adjusted in real time according to different services.

Figure 3:
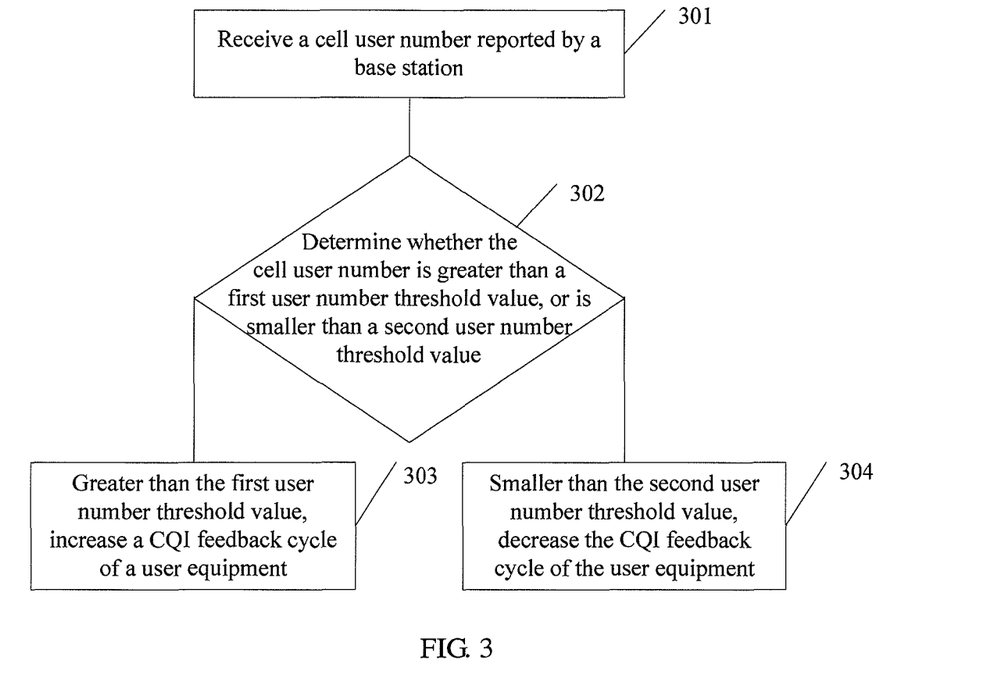
FIG. 3 is a schematic flowchart of a method for adjusting a CQI feedback cycle according to another embodiment of the present invention.

FIG. 3 is a schematic flowchart of a method for adjusting a CQI feedback cycle according to another embodiment of the present invention, including:

Step 301: Receive a cell user number reported by a base station.

The cell user number is monitored by the base station and reported by the base station to a base station controlling apparatus.

Step 302: Determine whether the cell user number is greater than a first user number threshold value, or is smaller than a second user number threshold value.

If the base station controlling apparatus determines that the cell user number is greater than the first user number threshold value, it indicates that there are a relatively large number of services, and an uplink capacity may encounter a bottleneck, and execute step 303: increase a CQI feedback cycle of a user equipment. That is, the base station controlling apparatus adjusts a short cycle to a long cycle.

Further, if the base station controlling apparatus determines that the fed back cell user number is smaller than the second user number threshold value, it indicates that a network is in a non-busy state, a network load is relatively small, and the uplink capacity encounters no bottleneck, and execute step 304: decrease the CQI feedback cycle of the user equipment. That is, the base station controlling apparatus adjusts the long cycle to the short cycle.

Further, the first user number threshold value and the second user number threshold value are set by the base station controlling apparatus, and the first user number threshold value is greater than the second user number threshold value. The foregoing threshold values can be adjusted in real time according to different services.

Figure 4:
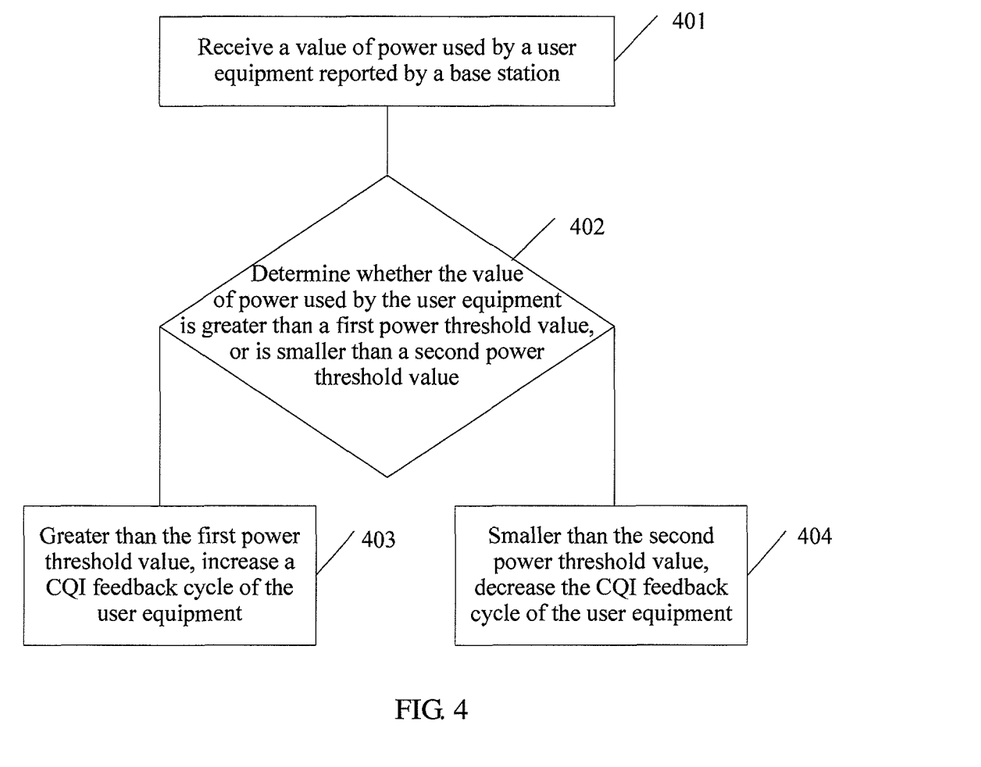
FIG. 4 is a schematic flowchart of a method for adjusting a CQI feedback cycle according to another embodiment of the present invention.

FIG. 4 is a schematic flowchart of a method for adjusting a CQI feedback cycle according to another embodiment of the present invention, including:

Step 401: Receive a value of power used by a user equipment reported by a base station.

The user equipment reports a transmit power headroom (UE transmission Power Headroom, UPH), and the base station receives the reported user equipment transmit power headroom, calculates a value of transmit power used by the user equipment according to the user equipment transmit power headroom and a maximum user equipment transmit power value, and reports the value of transmit power used to a base station controlling apparatus.

Step 402: Determine whether the value of power used by the user equipment is greater than a first power threshold value, or is smaller than a second power threshold value.

The first power threshold value and the second power threshold value are set by the base station controlling apparatus, and the first power threshold value is greater than the second power threshold value. The foregoing power threshold values can be adjusted correspondingly according to different scenarios.

Further, if the base station controlling apparatus determines that the value of power used by the user equipment is greater than the first power threshold value, it indicates that the user equipment transmit power is limited, and execute step 403: increase a CQI feedback cycle of the user equipment. That is, the base station controlling apparatus selects a great feedback cycle and sends the feedback cycle to the user equipment, so that the user equipment occupies relatively low transmit power, thereby improving uplink coverage of a user equipment at a cell edge, and enabling a user in a cell center to maximize an HSDPA downlink throughput rate. When the base station controlling apparatus determines that the value of power used by the user equipment is smaller than the second power threshold value, it indicates that the user equipment transmit power is changed from a limited state to an unlimited state, and execute step 404: decrease the CQI feedback cycle of the user equipment. That is, the base station controlling apparatus selects a small feedback cycle and sends the feedback cycle to the user equipment.

Figure 5:
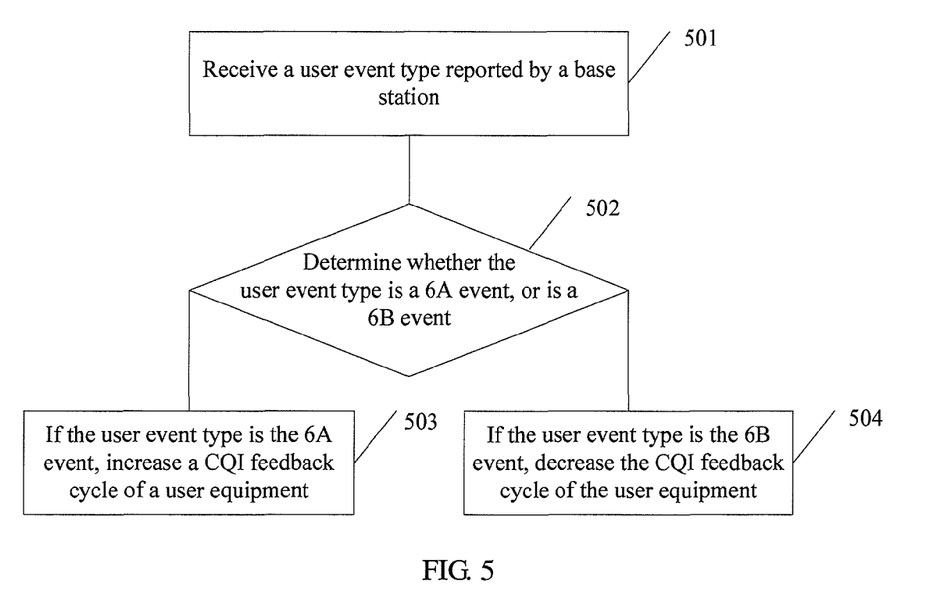
FIG. 5 is a schematic flowchart of a method for adjusting a CQI feedback cycle according to another embodiment of the present invention.

FIG. 5 is a schematic flowchart of a method for adjusting a CQI feedback cycle according to another embodiment of the present invention, including:

Step 501: Receive a user event type reported by a base station.

A user equipment measures it's transmit power, and if the transmit power is higher than a threshold for some time, the user equipment reports a 6A event to the base station. When the transmit power is lower than another threshold for some time, the user equipment reports a 6B event to the base station. The base station transparently transmits the received event type to a base station controlling apparatus.

Step 502: Determine whether the user event type is the 6A event, or is the 6B event.

The base station controlling apparatus performs determination according to the event reported by the base station. If it is determined that the event type is the 6A event, it indicates that a user equipment transmit power is higher than a certain threshold for some time, and the user equipment transmit power is limited, and execute step 503: increase a CQI feedback cycle of the user equipment. That is, the base station controlling apparatus selects a great feedback cycle and sends the feedback cycle to the user equipment, so that the user equipment occupies relatively low transmit power, thereby improving uplink coverage of a user equipment at a cell edge, and enabling a user in a cell center to maximize an HSDPA downlink throughput rate. If the base station controlling apparatus determines that the event type is the 6B event, it indicates that the user equipment transmit power is changed from a limited state to an unlimited state, and execute step 504: decrease the CQI feedback cycle of the user equipment. That is, the base station controlling apparatus selects a small feedback cycle and sends the feedback cycle to the user equipment.

Figure 6:
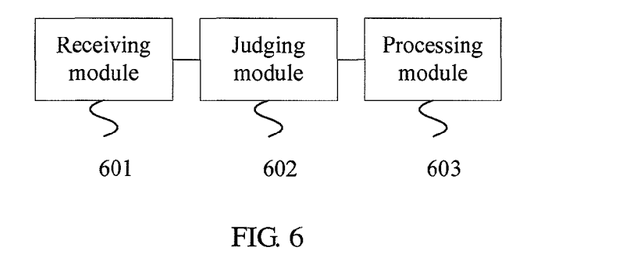
FIG. 6 is a schematic structural diagram of an apparatus for adjusting a CQI feedback cycle according to an embodiment of the present invention.

FIG. 6 is a schematic structural diagram of an apparatus for adjusting a CQI feedback cycle according to an embodiment of the present invention, and the apparatus may be a base station controller, configured to execute the method for adjusting a CQI feedback cycle according to the embodiments of the present invention, where the apparatus includes a receiving module 601, a judging module 602, and a processing module 603.

The receiving module 601 is configured to receive a CQI adjustment parameter fed back by a base station.

The adjustment parameter may be a cell load value, or a cell user number, or a user equipment transmit power.

The judging module 602 is configured to determine, according to the CQI adjustment parameter received by the receiving module, whether a CQI feedback cycle of a user equipment needs to be adjusted.

For a specific determination process, reference may be made to the descriptions in the foregoing method embodiments.

The processing module 603 is configured to, when the judging module determines that the CQI feedback cycle needs to be adjusted, adjust the CQI feedback cycle of the user equipment, and send an adjusted CQI feedback cycle to the user equipment.

In implementation, the judging module 602 and the processing module 603 may be in a same physical entity or in different physical entities.

In the embodiment of the present invention, the CQI feedback cycle of the user equipment is dynamically adjusted according to a real-time network state, for example, the cell load situation, the user number, and the user equipment transmit power, so as to increase an uplink throughput rate and cell uplink coverage.

Figure 7:
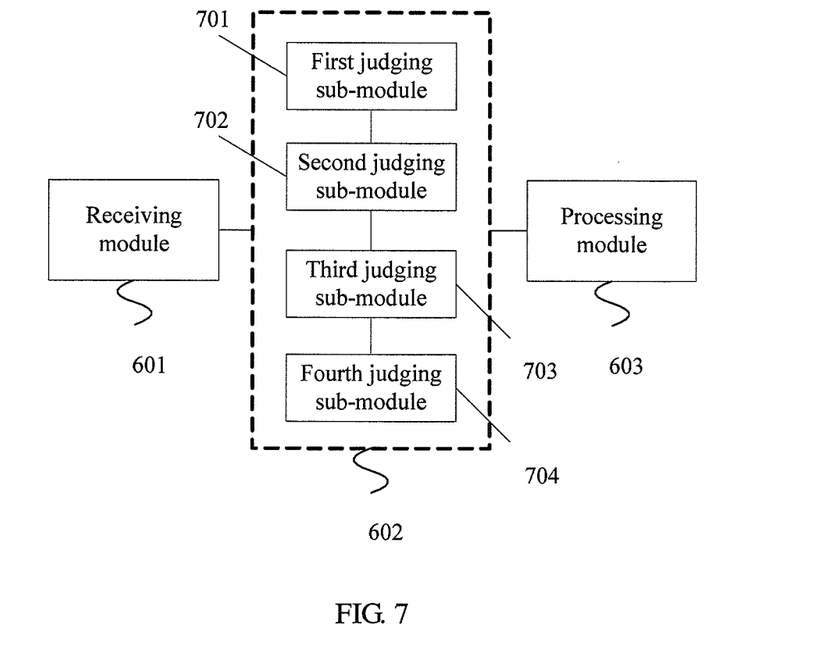
FIG. 7 is a schematic structural diagram of an apparatus for adjusting a CQI feedback cycle according to another embodiment of the present invention.

FIG. 7 is a schematic structural diagram of an apparatus for adjusting a CQI feedback cycle according to another embodiment of the present invention.

When the CQI adjustment parameter is a cell load value measured by the base station, the judging module 602 may further include:

a first judging sub-module 701, configured to determine whether the cell load value measured by the base station is greater than a first load threshold value, and when the cell load value measured by the base station is greater than the first load threshold value, adjusting the CQI feedback cycle of the user equipment is increasing the CQI feedback cycle of the user equipment; and determine whether the cell load value measured by the base station is smaller than a second load threshold value, and when the cell load value measured by the base station is smaller than the second load threshold value, adjusting the CQI feedback cycle of the user equipment is decreasing the CQI feedback cycle of the user equipment. When the cell load value is between the first load threshold value and the second load threshold value, no adjustment is performed.

When the CQI adjustment parameter is a cell user number measured by the base station, the judging module may further include:

a second judging sub-module 702, configured to determine whether the cell user number measured by the base station is greater than a first user number threshold value, and when the cell user number measured by the base station is greater than the first user number threshold value, adjusting the CQI feedback cycle of the user equipment is increasing the CQI feedback cycle of the user equipment; and determine whether the cell user number measured by the base station is smaller than a second user number threshold value, and when the cell user number measured by the base station is smaller than the second user number threshold value, adjusting the CQI feedback cycle of the user equipment is decreasing the CQI feedback cycle of the user equipment. When the cell user number is between the first user number threshold value and the second user number threshold value, no adjustment is performed.

When the CQI adjustment parameter is a value of power used by a user equipment reported by the base station, the judging module may further include:

a third judging sub-module 703, configured to determine whether the value of power used by the user equipment reported by the base station is greater than a first power threshold value, and when the value of power used by the user equipment is greater than the first power threshold value, adjusting the CQI feedback cycle of the user equipment is increasing the CQI feedback cycle of the user equipment; and determine whether the value of power used by the user equipment reported by the base station is smaller than a second power threshold value, and when the value of power used by the user equipment is smaller than the second power threshold value, adjusting the CQI feedback cycle of the user equipment is decreasing the CQI feedback cycle of the user equipment. When the value of power used by the user equipment is between the first power threshold value and the second power threshold value, no adjustment is performed.

When the CQI adjustment parameter is a user event type reported by the base station, the judging module may further include:

a fourth judging sub-module 704, configured to determine whether the user event type reported by the base station is a 6B event, and when the user event type is the 6B event, adjusting the CQI feedback cycle of the user equipment is increasing the CQI feedback cycle of the user equipment; and determine whether the user event type reported by the base station is a 6A event, and when the user event type is the 6A event, adjusting the CQI feedback cycle of the user equipment is decreasing the CQI feedback cycle of the user equipment.

Figure 8:
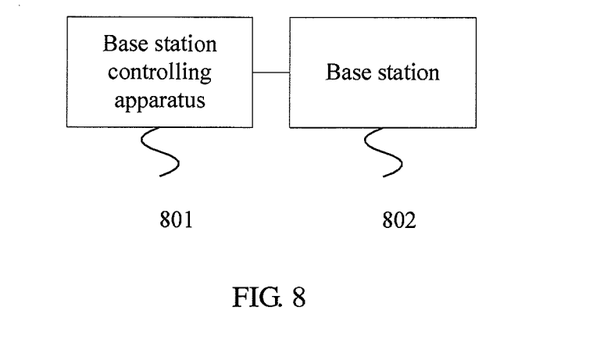
FIG. 8 is a schematic structural diagram of a system for adjusting a CQI feedback cycle according to an embodiment of the present invention.

FIG. 8 is a schematic structural diagram of a system for adjusting a CQI feedback cycle according to an embodiment of the present invention, including a base station controlling apparatus 801 and a base station 802.

The base station controlling apparatus 801 is the apparatus described in the embodiment of FIG. 6 or FIG. 7.

The base station 802 is configured to feed back a CQI adjustment parameter to the base station controlling apparatus 801, and when the base station controlling apparatus 801 determines that a CQI feedback cycle needs to be adjusted, forward a CQI feedback cycle adjusted by the base station controlling apparatus 801 to a user equipment.

Further, the base station 802 is further configured to receive a transmit power headroom reported by the user equipment, calculate a user equipment transmit power using value according to the user equipment transmit power headroom and a maximum user equipment transmit power value, and report the transmit power using value to the base station controlling apparatus 801.

It can be understood that, relevant features of the foregoing methods and apparatuses may be cross-referenced.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for adjusting a channel quality indicator (CQI) feedback cycle, the method comprising:

receiving a channel quality indicator (CQI) adjustment parameter fed back by a base station, and determining, according to the CQI adjustment parameter, whether a CQI feedback cycle of a user equipment needs to be adjusted; and when it is determined that the CQI feedback cycle needs to be adjusted, adjusting the CQI feedback cycle of the user equipment, and sending an adjusted CQI feedback cycle to the user equipment, wherein:

the CQI adjustment parameter is a cell load value measured by the base station;

determining, according to the CQI adjustment parameter, whether the CQI feedback cycle of the user equipment needs to be adjusted, comprises:

determining whether the cell load value measured by the base station is greater than a first load threshold value, or is smaller than a second load threshold value; and adjusting the CQI feedback cycle of the user equipment comprises:

increasing the CQI feedback cycle of the user equipment when the cell load value measured by the base station is greater than the first load threshold value, or decreasing the CQI feedback cycle of the user equipment when the cell load value measured by the base station is smaller than the second load threshold value, and wherein the first load threshold value is greater than the second load threshold value.

2. The method for adjusting the CQI feedback cycle according to claim 1, wherein sending an adjusted CQI feedback cycle to the user equipment comprises:

sending a radio bearer (RB) reconfiguration instruction to the user equipment, wherein the reconfiguration instruction carries an adjusted CQI feedback cycle, to enable the user equipment to perform CQI feedback according to the adjusted CQI feedback cycle.

3. A method for adjusting a channel quality indicator (CQI) feedback cycle, the method comprising:

receiving a channel quality indicator (CQI) adjustment parameter fed back by a base station, and determining, according to the CQI adjustment parameter, whether a CQI feedback cycle of a user equipment needs to be adjusted; and when it is determined that the CQI feedback cycle needs to be adjusted, adjusting the CQI feedback cycle of the user equipment, and sending an adjusted CQI feedback cycle to the user equipment, wherein:

the CQI adjustment parameter is a cell user number measured by the base station;

determining, according to the CQI adjustment parameter, whether the CQI feedback cycle of the user equipment needs to be adjusted, comprises:

determining whether the cell user number measured by the base station is greater than a first user number threshold value, or is smaller than a second user number threshold value; and adjusting the CQI feedback cycle of the user equipment comprises:

increasing the CQI feedback cycle of the user equipment when the cell user number measured by the base station is greater than the first user number threshold value, or decreasing the CQI feedback cycle of the user equipment when the cell user number measured by the base station is smaller than the second user number threshold value, and wherein the first user number threshold value is greater than the second user number threshold value.

4. The method for adjusting the CQI feedback cycle according to claim 3, wherein sending an adjusted CQI feedback cycle to the user equipment comprises:

sending a radio bearer (RB) reconfiguration instruction to the user equipment, wherein the reconfiguration instruction carries an adjusted CQI feedback cycle, to enable the user equipment to perform CQI feedback according to the adjusted CQI feedback cycle.

5. A method for adjusting a channel quality indicator (CQI) feedback cycle, the method comprising:

receiving a channel quality indicator (CQI) adjustment parameter fed back by a base station, and determining, according to the CQI adjustment parameter, whether a CQI feedback cycle of a user equipment needs to be adjusted; and when it is determined that the CQI feedback cycle needs to be adjusted, adjusting the CQI feedback cycle of the user equipment, and sending an adjusted CQI feedback cycle to the user equipment, wherein:

the CQI adjustment parameter is a value of power used by the user equipment reported by the base station;

determining, according to the CQI adjustment parameter, whether the CQI feedback cycle of the user equipment needs to be adjusted, comprises:

determining whether the value of power used by the user equipment reported by the base station is greater than a first power threshold value, or is smaller than a second power threshold value; and adjusting the CQI feedback cycle of the user equipment comprises:

increasing the CQI feedback cycle of the user equipment when the value of power used by the user equipment is greater than the first power threshold value, or decreasing the CQI feedback cycle of the user equipment when the value of power used by the user equipment is smaller than the second power threshold value, and wherein the first power threshold value is greater than the second power threshold value.

6. The method for adjusting the CQI feedback cycle according to claim 5, wherein sending an adjusted CQI feedback cycle to the user equipment comprises:

sending a radio bearer (RB) reconfiguration instruction to the user equipment, wherein the reconfiguration instruction carries an adjusted CQI feedback cycle, to enable the user equipment to perform CQI feedback according to the adjusted CQI feedback cycle.

7. An apparatus for adjusting a channel quality indicator (CQI) feedback cycle, the apparatus comprising:

a processor; and memory coupled to the processor, the memory comprising instructions that, when executed by the processor, cause the apparatus to:

receive a channel quality indicator (CQI) adjustment parameter fed back by a base station;

determine, according to the CQI adjustment parameter received by the receiving module, whether a CQI feedback cycle of a user equipment needs to be adjusted; and in response to determining that the CQI feedback cycle needs to be adjusted, adjust the CQI feedback cycle of the user equipment, and send an adjusted CQI feedback cycle to the user equipment, wherein:

the CQI adjustment parameter is a cell load value measured by the base station; and further comprising instructions that, when executed by the processor, cause the apparatus to:

determine whether the cell load value measured by the base station is greater than a first load threshold value, and when the cell load value measured by the base station is greater than the first load threshold value, adjusting the CQI feedback cycle of the user equipment comprises increasing the CQI feedback cycle of the user equipment, and determine whether the cell load value measured by the base station is smaller than a second load threshold value, and when the cell load value measured by the base station is smaller than the second load threshold value, adjusting the CQI feedback cycle of the user equipment comprises decreasing the CQI feedback cycle of the user equipment.

8. An apparatus for adjusting a channel quality indicator (CQI) feedback cycle, the apparatus comprising:
a processor; and
memory coupled to the processor, the memory comprising instructions that, when executed by the processor, cause the apparatus to:
receive a channel quality indicator (CQI) adjustment parameter fed back by a base station;
determine, according to the CQI adjustment parameter received by the receiving module, whether a CQI feedback cycle of a user equipment needs to be adjusted; and
in response to determining that the CQI feedback cycle needs to be adjusted, adjust the CQI feedback cycle of the user equipment, and send an adjusted CQI feedback cycle to the user equipment, wherein:
the CQI adjustment parameter is a cell user number measured by the base station; and
further comprising instructions that, when executed by the processor, cause the apparatus to:
determine whether the cell user number measured by the base station is greater than a first user number threshold value, and when the cell user number measured by the base station is greater than the first user number threshold value, adjusting the CQI feedback cycle of the user equipment comprises increasing the CQI feedback cycle of the user equipment, and
determine whether the cell user number measured by the base station is smaller than a second user number threshold value, and when the cell user number measured by the base station is smaller than the second user number threshold value, adjusting the CQI feedback cycle of the user equipment comprises decreasing the CQI feedback cycle of the user equipment.

9. An apparatus for adjusting a channel quality indicator (CQI) feedback cycle, the apparatus comprising:
a processor; and
memory coupled to the processor, the memory comprising instructions that, when executed by the processor, cause the apparatus to:
receive a channel quality indicator (CQI) adjustment parameter fed back by a base station;
determine, according to the CQI adjustment parameter received by the receiving module, whether a CQI feedback cycle of a user equipment needs to be adjusted; and
in response to determining that the CQI feedback cycle needs to be adjusted, adjust the CQI feedback cycle of the user equipment, and send an adjusted CQI feedback cycle to the user equipment, wherein:
the CQI adjustment parameter is a value of power used by the user equipment reported by the base station; and
further comprising instructions that, when executed by the processor, cause the apparatus to:
determine whether the value of power used by the user equipment reported by the base station is greater than a first power threshold value, and when the value of power used by the user equipment is greater than the first power threshold value, adjusting the CQI feedback cycle of the user equipment comprises increasing the CQI feedback cycle of the user equipment, and
determine whether the value of power used by the user equipment reported by the base station is smaller than a second power threshold value, and when the value of power used by the user equipment is smaller than the second power threshold value, adjusting the CQI feedback cycle of the user equipment comprises decreasing the CQI feedback cycle of the user equipment.

10. A system for adjusting a channel quality indicator (CQI) feedback cycle, comprising:
a base station;
a base station controlling apparatus configured to:
receive a channel quality indicator (CQI) adjustment parameter fed back by the base station,
determine, according to the CQI adjustment parameter, whether a CQI feedback cycle of a user equipment needs to be adjusted, and
when the base station controlling apparatus determines that the CQI feedback cycle needs to be adjusted, adjust the CQI feedback cycle of the user equipment; and
the base station is configured to feed back the CQI adjustment parameter to the base station controlling apparatus, and forward a CQI feedback cycle adjusted by the base station controlling apparatus to a user equipment.

11. The system for adjusting the CQI feedback cycle according to claim 10, wherein the feedback CQI adjustment parameter is a cell load value, a cell user number or a user equipment transmit power value.

* * * * *